Feb. 3, 1931.  W. P. JENNY  1,791,413
APPARATUS FOR TAKING GEOPHYSICAL MEASUREMENTS
BY MEANS OF A ROTATABLE BALANCE
Filed Jan. 16, 1929    4 Sheets-Sheet 3

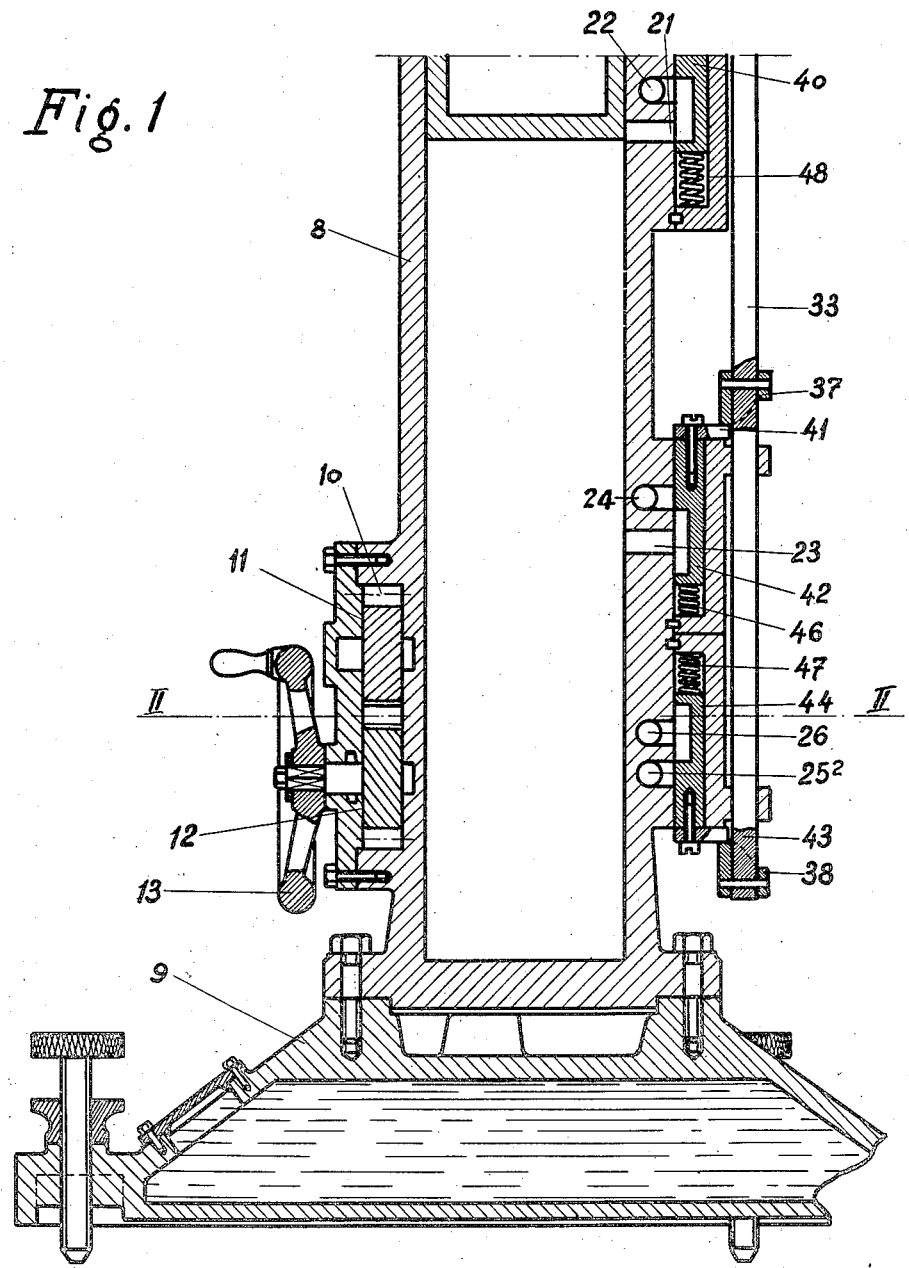

W. P. Jenny
INVENTOR

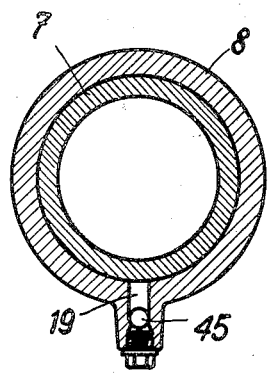
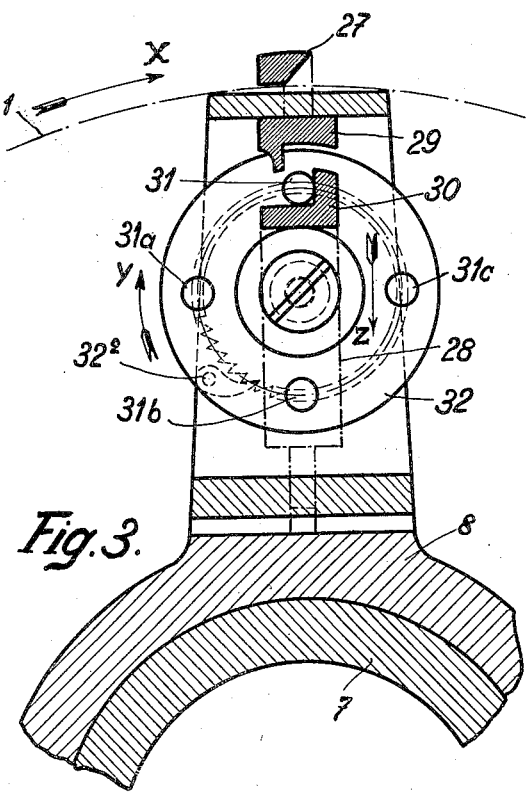
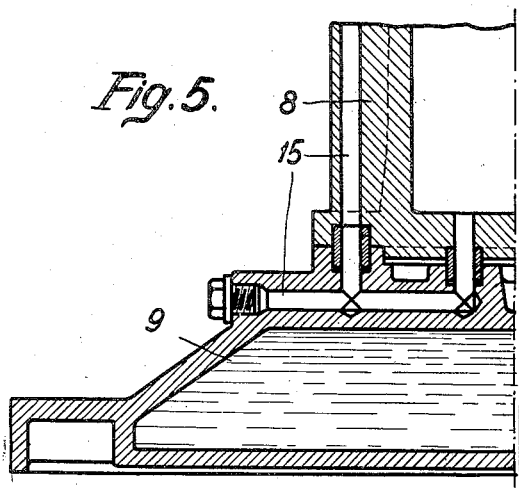
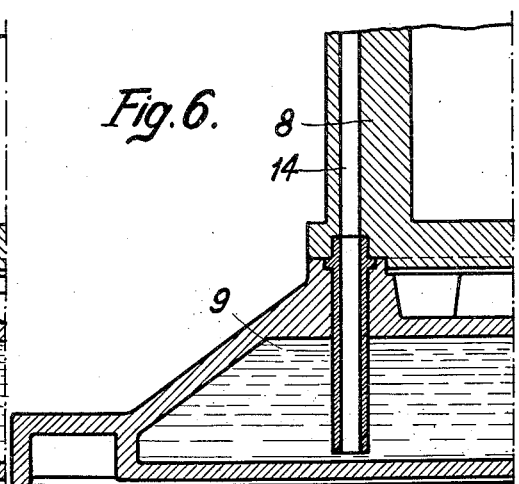

Patented Feb. 3, 1931

1,791,413

UNITED STATES PATENT OFFICE

WILLY PAUL JENNY, OF STRASBURG, OHIO, ASSIGNOR TO THE FIRM EXPLORATION G. M. B. H., OF HANOVER, GERMANY

APPARATUS FOR TAKING GEOPHYSICAL MEASUREMENTS BY MEANS OF A ROTATABLE BALANCE

Application filed January 16, 1929, Serial No. 332,898, and in Germany January 9, 1928.

The present invention relates to the so called Eötvös balances used for taking geophysical measurements and consists in an adjustable stand for such a balance with means for raising a base plate supporting the balance to the upmost measuring position where the base plate is rotated automatically and for sinking the plate afterwards and rotating it automatically in one or more lower measuring stations.

In the annexed drawings a part of an Eötvös balance has been represented. This balance may be used for carrying out the adjustable stand according to the present invention. Only those parts are shown which are needed for displacing the beam in height. The arrangement of the beam itself, its suspension and the registering of the results of measuring and also the impulse of the balance around its axis of suspension are supposed to be already known.

Fig. 1 and 1a together are a section through the central axis of a support of the measuring apparatus.

Fig. 3 is a partial section on line III—III of Fig. 1a.

Fig. 4 is a section on line IV—IV of Fig. 1a.

Fig. 5 is a partial section in elevation on line V—V of Fig. 2, and

Fig. 6 is a partial section on line VI—VI of Fig. 2.

Figure 1A:
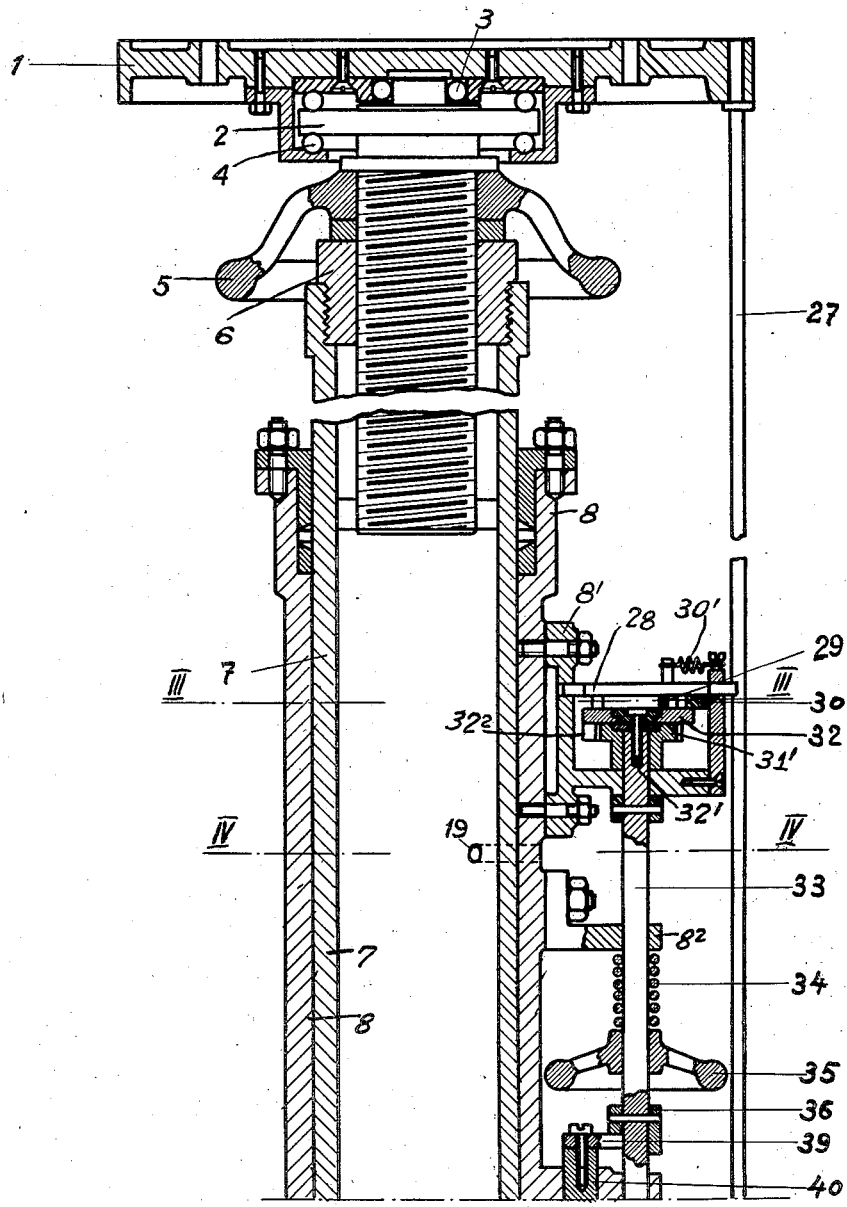

The rotatable balance, not shown, is fixed on a base plate 1, which is freely rotatable around a pivot 2. The rotatable movement of this plate is assured by ball bearings 3, while two other ball bearings 4 take up the vertical stresses. The pivot 2 is threaded on a portion of its length and is held adjustably by means of a hand wheel 5 in a screw nut 6 secured to the top end of the piston which may be raised or sunk by means of a hydraulic device in a cylinder 8 bolted to a pedestal 9 used as a container.

Figure 2:
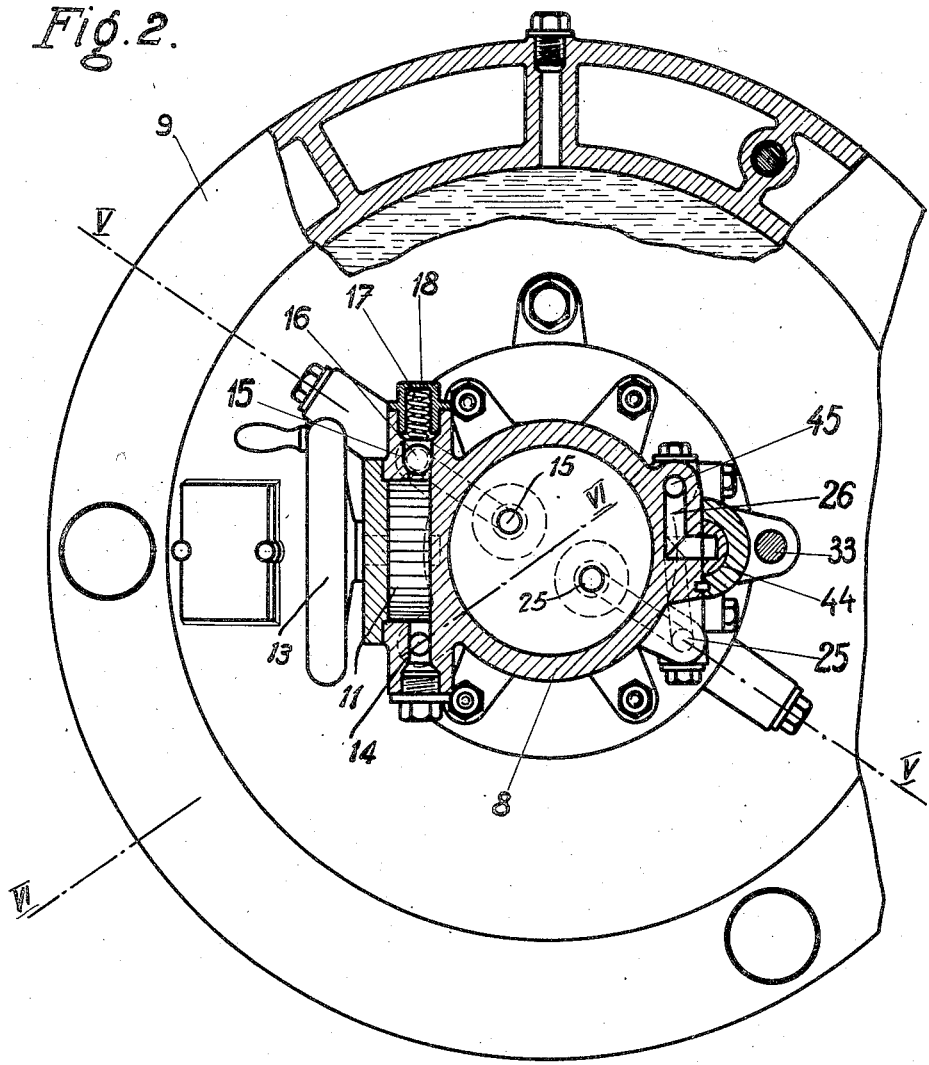
Fig. 2 is a section on line II—II of the Fig. 1.

The cylinder 8 can communicate with this container by passages opened and shut by mechanism described later on. It is provided at its base with a lateral chamber 10 enclosing the pinions 11 and 12 of an oil pump operated by a hand wheel 13. This pump is connected to the container 9 by means of a suction passage 14 shown especially in Figs. 2, 5 and 4. If this pump is worked oil is sent through the passages 15 under the piston 7 (Fig. 5) and thus means are provided for lifting the base plate into its highest position. A ball 16 which under the effect of the spring 17 is bearing on the bottom of a cap 18 (Fig. 2) hinders the return of the oil from the cylinder into the pump and hinders also the backward movement of the pump which would cause an automatic sinking of the plate 1.

When the piston 7 has reached this highest position the port 19 (see Fig. 4) communicating by a canal 45 with the container 9 is uncovered so that the oil fed in surplus by the pump returns forthwith to its source without causing the piston to be lifted further.

When the balance is ready to be operated a clock-work, not shown in the drawing, is started and will rotate the device.

The base plate 1 will turn slowly in the direction of the arrow X (Fig. 3) and will take rod 27 held rigidly fast by said plate along with it. When the plate 2 has completed a whole revolution rod 27 will come into contact with the bevelled end of a bolt 28 arranged diametrically to a disk 32 and held slidably in a bracket $8^1$ attached to the cylinder 8. This bolt is maintained by means of a spring $30^1$ in a position where it projects with its bevelled end into the path of the rod 27 and where the inner 30, of the two angularly-shaped catches 29, 30, fixed to the bolt, has caught one 31, of four stop pins 31, $31^a$, $31^b$, $31^c$ fixed to said disk 32. This disk is held rotatably by means of a pivot pin $32^1$ at the upper end of a steering camshaft 33, which carries at this end a ratchet wheel $31^1$ fast thereto and engaging a pawl $32^2$ mounted on the bottom side of disk 32. The cam shaft 33 is lodged not only in the bracket $8^1$ but also in a bracket $8^2$ into which one end of a torsional spring 34 is attached the other end of which is fast to a hand wheel 35 fixed to the shaft 33. Now each time before the base plate has been raised into its upmost position the wheel 35 has been turned with the shaft for several revolutions so that spring 34 will be bent sufficiently for returning the released shaft safely for at least one revolution. Shaft 33 however is retained in its wound-up position by the pin 31 bearing on the catch 30 of bolt 28, as already mentioned in the above.

Under such conditions bolt 28 will be pushed back by the passing rod 27 so that pin 31 will be released from catch 30 and escape through the slot left open between the two catches. Catch 31 will now come into the path of the pins 31, $31^a$, $31^b$, $31^c$ so that the released disk 32 can only execute a quarter of a revolution because pin $31^a$ will be arrested by the outside of catch 29. As soon however when the passing rod 27 has released again bolt 28 this bolt will assume its initial position and pin $31^a$ will slip into the former position of pin 31. This play of bolt 28 will be repeated for each revolution of the base plate 1 so that for each such revolution the steering cam shaft 33 will execute a quarter turn.

Now this steering shaft 33 carries three cams 36, 37, 38 for controlling by means of the noses 39, 41, 43 the slides 40, 42, 44 which are under the influence of springs 48, 46, 47. The shape and the reciprocal position of the three cams 36, 37, 38 are such that at the first quarter turn of the cam shaft 33 only the cam 36 will act on the slide 40 and leave it to the effect of the spring 48. The noses of the other slides at this moment are bearing on the straight parts of their respective cams. Under the effect of the spring 48 the slide 40 will move and establish the communication between the inside of cylinder 8 and the container 9 through the port 21 and the passage 22. This is effected through the canal 45 which establishes the communication between the container and the inside of cylinder 8 by three passages 22, 24 and 26 determining the three stations of plate 1 during its descent. The oil returns to the container and the piston 7 descends with the plate and with the balance mounted thereon into the position shown in Fig. 1. The clear passage of the port 21 is calculated so that the descending movement of the piston is slow enough that no oscillations of the suspended pendulum masses of the balance will take place, that is, no movements which might interfere with the exactness of the measuring.

From the moment when the port 21 has been closed unto the moment when the clear passage of this opening has become small enough so as to interrupt the flow of the oil a certain time will elapse during which the downward movement is constantly braked and thus a jerkless displacing into the new position will be secured. It is easily understood that the shape of the ports 21 or 23 may be chosen so that the braking has quite a determined value. After the stopping of the downward movement the base plate 1 continues turning and after the working of bolt 28 the plate 32 turns again a quarter turn. The cams 36, 38 have now no influence on the slides but now cam 37 becomes active and will release the slide 42. The latter moved by the spring 46 will uncover the port 23 and establish the communication between the inside of the cylinder 8 and the container 9 through the passages 24 and 45. The base plate 1 sinks again and this sinking will be stopped, when the port 23 is closed by the piston 7. After a third revolution of the base plate and rod 27 a further quarter turn of the shaft 33 will be effected. The cam 38 releases the slide 44 and the latter uncovers the opening 25. Now the cams 36 and 37 will remain without influence on the slides which they had moved at first and the third and last sinking will be effected. This sinking is only stopped when the piston 7 touches the bottom of the cylinder 8. The port 25 opens therefore no more into the side wall of the cylinder 8 but into the bottom of the said cylinder (see Figs. 2 and 5) and communicates with the container through the slide 44 by means of a drilled horizontal passage $25^1$ provided in the pedestal 9. The orifice of the opening of the port 25 into the cylinder 8 could be made conical in order to prevent that the movement into the last position would take place with a jerk. After this last sinking the base plate will turn a last time so that a fourth diagram may be obtained with a balance placed on the base plate 1.

If it is desired to bring all three slides back into their initial position it suffices to turn the hand wheel 35 in a contrary direction to that of the arrow Y in Fig. 3. The plate 32 will remain locked by the bolt 28, but the shaft 33 can be turned in spite of that by means of the ratchet coupling $32^1$, $33^1$ shown in Fig. $1^a$. The slides 40, 42 and 44 will be brought back into their initial position by means of the cams.

It is to be noted that instead for four revolutions the balance might also be built for more or less or only for a part of a revolution with a subsequent sinking into another position. The number of possibilities for controlling and stopping will be correspondingly higher.

What I claim as new is:

1. In an adjustable stand for a rotatable balance intended for executing geophysical measurements and in combination, a pedestal constituting a container for a liquid and forming the base of the stand, a cylinder fixed to this pedestal, a piston fitted slidably into this cylinder and a pivot-plate held adjustably in the top end of this piston, a base-plate of the balance mounted rotatably on this pivot-plate, a pressure pump provided with a hand wheel and attached to the cylinder, a system of canals as means of communication between cylinder and container, slides adapted to control these communications and operative means between base plate and slides.

2. In an adjustable stand for a rotatable balance intended for executing geophysical measurements and in combination, a pedestal constituting a container for a liquid and forming the base of the stand, a cylinder fixed to this pedestal, a piston fitted slidably into this cylinder and a pivot plate held adjustably in the top end of this piston, a base-plate of the balance mounted rotatably on this pivot-plate, a pressure-pump provided with a hand wheel and attached to the cylinder, a system of canals as means of communication between cylinder and container, slides adapted to control these communications and a cam shaft as operative means between base plate and slides.

3. In an adjustable stand for a rotatable balance intended for executing geophysical measurements and in combination a pedestal constituting a container for a liquid and forming the base of the stand, a cylinder fixed to this pedestal, a piston fitted slidably into this cylinder and a pivot-plate held adjustably in the top end of this piston, a base plate of the balance mounted rotatably on this pivot plate, a pressure pump provided with a hand wheel and attached to the cylinder, a system of canals as means of communication between cylinder and container, slides adapted to control these communications, and a cam shaft as operative means between base plate and slides, and a bolting device inserted between base plate and cam shaft with a view of blocking the descent of the base plate from its upmost position at several intermediate measuring stations and comprising, a disk carrying a number of stop pins and mounted rotatably on a pivot pin at the top end of the cam shaft, a ratchet wheel mounted fast to this cam shaft right underneath said disk and a pawl fixed to the disk and engaged in said ratchet, a hand wheel fast to the shaft, a torsional spring sleeved on the shaft and secured to the wheel and to the said bracket, and a bolt provided with a bevelled end and held slidably in said bracket diametrically to the disk close above said stop pins, angular catches fast to the bolt and capable of arresting and releasing the stop pins and a rod extended from the periphery of the base plate and arranged to engage the bevelled end of the bolt at each revolution of said plate.

In testimony whereof I affix my signature.

DR. WILLY PAUL JENNY.